United States Patent [19]
Wolf et al.

[15] 3,638,506
[45] Feb. 1, 1972

[54] VARIABLE PULLEY ASSEMBLY
[72] Inventors: David L. Wolf; Robert A. Stelzer, both of Coldwater, Ohio
[73] Assignee: Avco Corporation, Coldwater, Ohio
[22] Filed: Aug. 3, 1970
[21] Appl. No.: 60,521

[52] U.S. Cl. .................................................. 74/230.17
[51] Int. Cl. .................................................. F16h 55/52
[58] Field of Search ......... 74/230.17 TL, 230.17 C, 230.17 B

[56] References Cited

UNITED STATES PATENTS 2,694,316   11/1954   Hultin ........................... 74/230.17 TL
2,952,161   9/1960    Williams ........................ 74/230.17 TL
2,994,228   8/1961    Osborne ........................ 74/230.17 TL Primary Examiner—C. J. Husar
Attorney—Charles M. Hogan and Gary M. Gron

[57] ABSTRACT

The disclosure illustrates a variable pulley assembly that may only be adjusted in a nonrotating state. When the pulley assembly is tightened in this state one of the sheaves making up the pulley is displaced away from the other sheave against a spring. The spring returns the displaced sheave to its proper position when the pulley assembly rotates.

6 Claims, 2 Drawing Figures

INVENTORS.
DAVID L. WOLF
BY ROBERT A. STELZER

ATTORNEYS.

VARIABLE PULLEY ASSEMBLY

The present invention relates to pulley assemblies and more particularly to variable pulley assemblies.

Variable pulley assemblies have long been used in the farm equipment industry. A typical use of this device is in the air blower which supplies a flow of air to separate chaff and other material from shelled corn. It is frequently necessary to adjust the speed of this blower to vary the separation according to changing field conditions.

These pulley assemblies generally comprises a pair of sheaves axially displaceable toward one another through a suitable arrangement. Their position relative to one another is adjusted while the pulleys are running to achieve a variation in the effective diameter of the pulley assembly and in turn vary the speed of the blower which is driven by the pulley assembly.

Several problems arise when a pulley assembly of this type is used in a field-going corn sheller. The operator of the vehicle which carries the sheller or other harvesting machines must frequently dismount from the driving position and adjust the pulley while the various driving belts and movable apparatus is in operation, which is a safety hazard.

Therefore, it is an object of the present invention to provide a variable pulley assembly which can be accurately and quickly adjusted when the pulley assembly is in a static state.

The above ends are achieved by a variable pulley assembly adapted to have a belt tightly trained thereover. The assembly comprises first and second sheaves mounted on a shaft for rotation and axially displaceable relative to one another. The displacement of the first sheave is adjustably positioned away from the second sheave only when the shaft is in a static state. The displacement of the second sheave toward the first sheave is limited. The second sheave is yieldably urged toward its displacement limit by a force low enough to yield in response to the displacement of the first sheave toward the second sheave when the pulley assembly is in a static state. However, the force is high enough to move the second pulley against the displacement unit in opposition to the frictional forces of the belt during rotation of the pulley assembly.

The above and other related objects and features of the present invention will be apparent from a reading of the description of the disclosure found in the accompanying drawing and the novelty thereof pointed out in the appended claims.

Figures 1, 2:
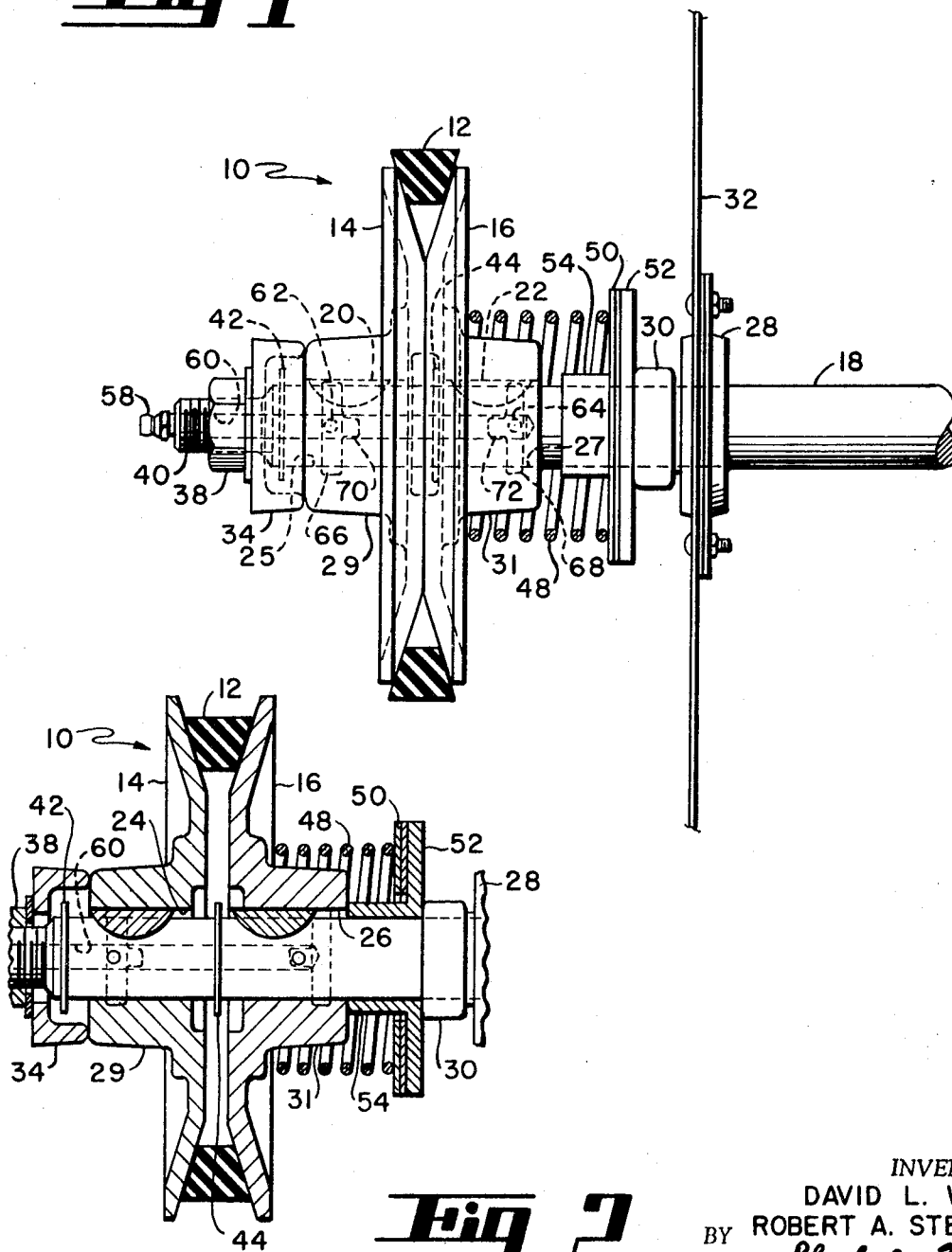
FIG. 1 is a longitudinal view of a variable pulley assembly embodying the present invention, shown in a position where it has a maximum effective diameter.
FIG. 2 is a longitudinal sectional view of the pulley assembly shown in FIG. 1 showing the manner in which the pulley assembly is adjusted during a static state.

Referring now to FIG. 1, there is shown a variable pulley assembly 10 adapted to have a belt 12 tightly trained over first and second sheaves 14, 16. The sheaves 14, 16 have central openings 25, 27 in hubs 29, 31, respectively. The sheaves 14, 16 are nonrotatably telescoped over a drive shaft 18 by means of keys 20 and 22, respectively. The keys 20, 22 are positioned in appropriate slots in the shaft 18 and are received in axially extending slots 24, 26 provided in bores 25, 27 of hubs 29 and 31.

The shaft 18 is journaled in a bearing assembly 28 suitably secured on the shaft by a locking collar 30. The bearing assembly 28 is mounted to a wall member 32 on a vehicle in suitable fashion. The belt 12 extends to another pulley assembly having a fixed or variable diameter. The relative variation in the effective diameters between this pulley assembly and pulley assembly 10 produces a variation in speed. It should be apparent that speed variations can be accomplished irrespective of whether shaft 18 is the driving or driven shaft.

The sheaves 14, 16 are axially displaceable relative to one another. The displacement of the first sheave 14 away from the second sheave 16 is adjustably limited by a collar 34 which abuts hub 29 of sheave 14 and a nut 38 rotatably positioned on a threaded end portion 40 of shaft 18. A suitable retaining clip 42 acts as a limit to the maximum possible displacement of sheave 14 away from sheave 16. This prevents the belt 12 from dropping between the sheaves.

The displacement of sheave 16 towards sheave 14 is limited by a retaining clip 44 suitably secured on shaft 18 between the first and second sheaves. The sheave 16 is yieldably urged toward retaining clip 44 by a spring 48 which abuts an adjusting washer 50 and a backup washer 52. The backup washer 52 abuts the retaining collar 30 of the bearing 28. A centrally positioned sleeve 54 is positioned so that the hub 31 of sheave 16 abuts the collar 54 to limit the maximum displacement of the sheave and prevent dropping of the belt 12 between the sheaves.

The free axial movement of the sheaves on the shaft 18 is assured by a lubricating system comprising a lubricant fitting 58 threaded into a longitudinal passage 60 in shaft 18. Radial passages 62, 64 extend from the passage 60 to annular recesses 66, 68 on the interior side of sheaves 14, 16. To insure that lubricant effectively flows irrespective of the positions of the sheaves, axially extending recesses 70, 72 extend from annular recesses 66, 68.

Since nut 38 is threaded on shaft 18, it rotates with it and it can be only adjusted when shaft 18 is in a static, nonrotating state. When the belt 12 is in an intermediate diameter position and it is desired to tighten the belt to the position of FIG. 1, the nut 38 is rotated to displace collar 34 and sheave 14 toward sheave 16. However, since the pulleys are at rest the frictional forces of the belt 12 and sheaves are so great that the belt cannot slide up to a greater effective diameter between the sheaves. As a result, the sheave 16 is displaced away from retaining clip 44 and against the action of spring 48, as shown in FIG. 2. When the pulley assembly is rotated, the frictional forces acting to hold the belt 12 in the intermediate position are lowered to the point where spring 48 can displace the sheave 16 against retaining clip 44 and urge the belt to an outermost position as shown in FIG. 1.

The spring constant of spring 48 is selected so that it is sufficiently low to yield in response to displacement of sheave 14 toward sheave 16 during a static condition. However, its constant is high enough to displace the sheave 16 against clip 44 during rotation. This spring constant may be adjusted within limits by adding more adjustment washers 50.

For loosening the belt 12 during a static condition it is simply necessary to rotate nut 38 to permit displacement of collar 34 and sheave 14 away from sheave 16, thereby permitting the belt 12 to ride down in the V between the pulleys. It is apparent from this that the pulley assembly described above forces an operator to adjust the effective diameter of the pulley when the pulley assembly is at rest but permits it to do so in spite of the significant frictional forces that must be overcome.

This pulley assembly may be utilized otherwise than as specifically disclosed without departing from the spirit and scope of the present invention. Therefore, it is intended that this invention be limited solely by the appended claims.

Having thus described the invention, what is claimed as novel and desired to be secured by Letters Patent of the United States is:

1. A variable pulley assembly adapted to have a belt tightly trained thereover, said assembly comprising:
   a rotatable shaft;
   first and second sheaves mounted for rotation with said shaft but axially displaceable relative to one another;
   an abutment element positioned on said shaft and adjustably positionable only when the shaft is in a static state for limiting the displacement of said first sheave away from the second sheave;
   means for limiting the displacement of the second sheave toward said first sheave;
   means for yieldably urging said second sheave toward its displacement limiting means, said yieldable urging means being adapted to generate a force low enough to yield in response to the displacement of said first sheave toward said second sheave when said pulley assembly is in a static state and high enough to displace said second pulley against said limiting means in opposition to the frictional forces of said belt during rotation of said pulley assembly.

2. A pulley assembly as in claim 1 wherein said adjustable displacement limiting means comprises a nut threaded on said shaft and a collar positioned between said nut and said first sheave, whereby rotation of said nut relative to said shaft in a given direction causes said collar to urge said first sheave toward said second sheave.

3. A pulley assembly as in claim 2 wherein said displacement limiting means for said second sheave comprises a retaining clip mounted on said shaft between said first and second sheaves.

4. A variable pulley assembly as in claim 3 wherein said yieldable urging means comprises a spring acting on said second sheave.

5. A variable pulley assembly as in claim 4 wherein said spring has an adjustable abutment to vary the force with which the spring urges the second sheave.

6. A variable pulley assembly as in claim 5 wherein:
said shaft has a longitudinal lubricating fluid passage and a pair of spaced radially extending passages generally in line with said sheaves;
said sheaves are telescoped over said shaft and have an annular recess for distributing lubricating fluid around the interior of the telescoped portion of said shaft;
said sheaves have recesses axially extending from said annular recesses and are positioned to communicate with said radial passages irrespective of the axial displacement of said sheaves.

* * * * *